Sept. 6, 1938.  E. C. BRISBANE ET AL  2,129,081
VALVE
Filed July 25, 1936  5 Sheets-Sheet 3

INVENTORS
EUGENE C. BRISBANE AND
ROBERT BISCHOFF
BY Malcolm F. Gannett
ATTORNEY

Sept. 6, 1938.   E. C. BRISBANE ET AL   2,129,081
VALVE
Filed July 25, 1936    5 Sheets-Sheet 4
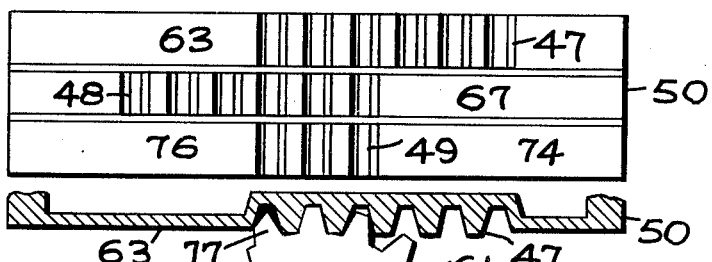
Fig. 7
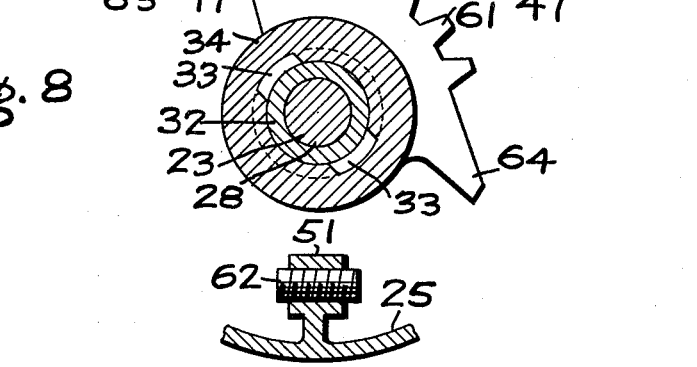
Fig. 8
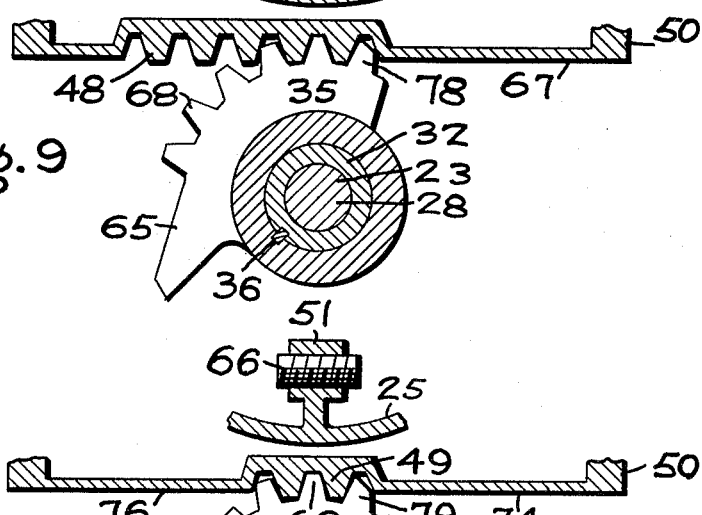
Fig. 9
Fig. 10
INVENTORS
EUGENE C. BRISBANE AND
BY ROBERT BISCHOFF
Malcolm P. Gannett
ATTORNEY Sept. 6, 1938.　　E. C. BRISBANE ET AL　　2,129,081
VALVE
Filed July 25, 1936　　5 Sheets-Sheet 5
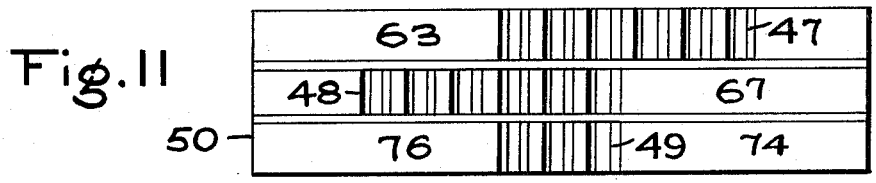
Fig. 11
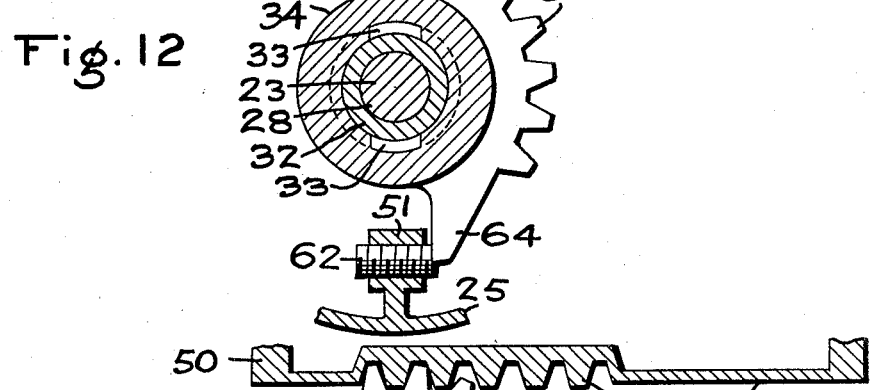
Fig. 12
Fig. 13
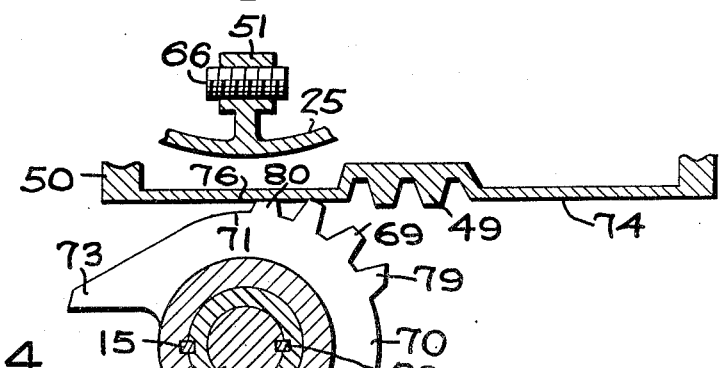
Fig. 14
INVENTORS
EUGENE C. BRISBANE AND
ROBERT BISCHOFF
BY
ATTORNEY Patented Sept. 6, 1938

2,129,081

UNITED STATES PATENT OFFICE 2,129,081

VALVE

Eugene C. Brisbane and Robert Bischoff, York, Pa., assignors to S. Morgan Smith Company, York, Pa., a corporation of Pennsylvania Application July 25, 1936, Serial No. 92,555

1 Claim. (Cl. 74—1)

This invention relates to valves, and more particularly to the mechanism for opening and closing the valve.

An object of the invention is to provide an improved valve of the type having a tapered plug, in which mechanism is provided for first raising the valve plug from its seat, then for rotating the plug to open or to closed position, and thirdly, for reseating the plug in either open or closed position.

Another object of the invention is to provide an improved valve structure which includes a rotatable plug having a shaft with a sleeve loosely mounted thereon, and a plurality of gear sectors operatively associated with the sleeve and shaft so that operation of the sectors effects operation of the sleeve and valve in such a way that the valve plug is operated in the desired manner.

Another object of the invention is to provide an improved valve operating mechanism of the above type in which the gear sectors are selectively operated by a plurality of rack bars, the movements of which are controlled by a single nut and screw.

Another object of the invention is to provide an improved valve structure of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Figure 1:
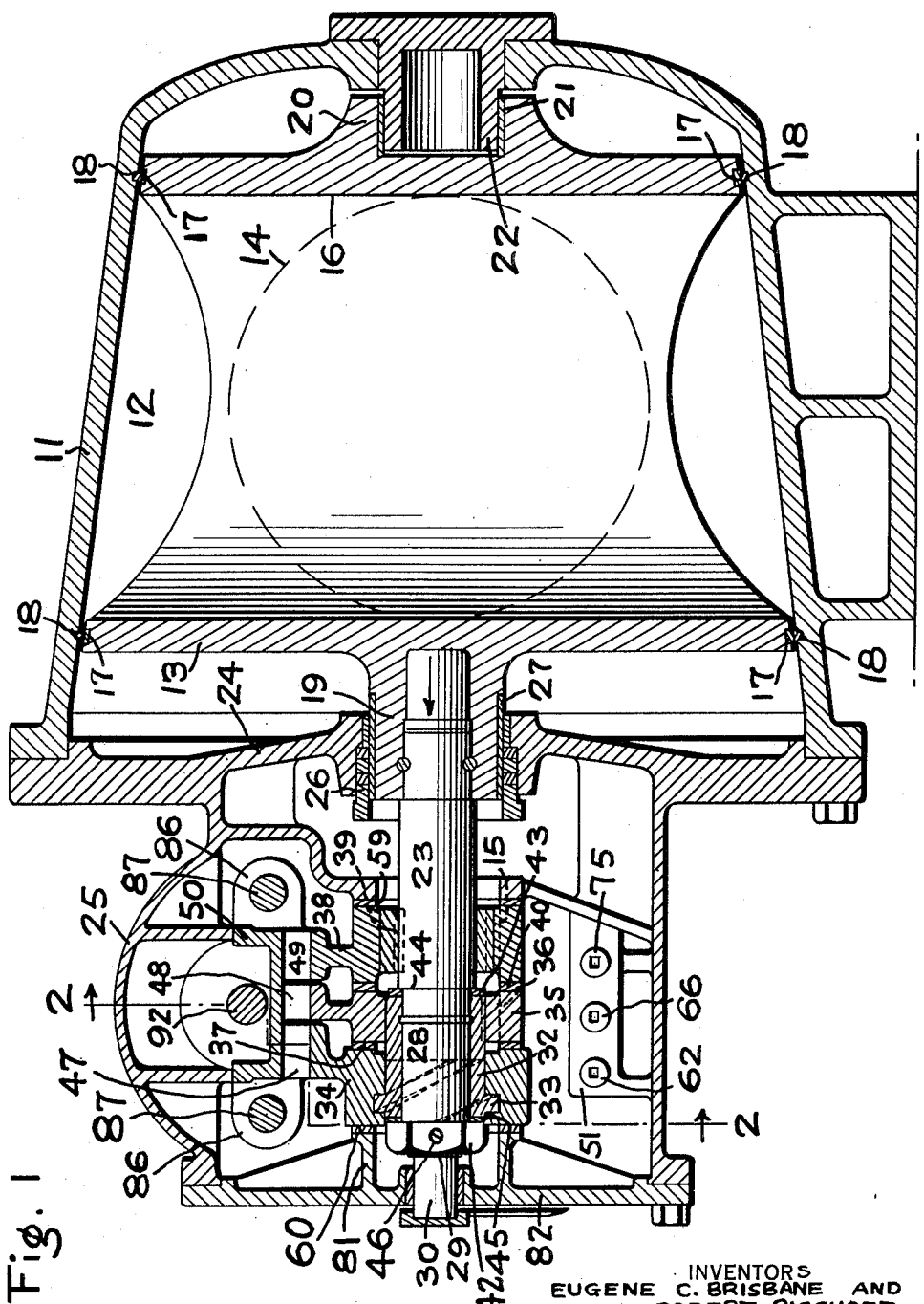
Figure 1 is a vertical longitudinal section through a valve embodying the present invention, the plug being shown in closed position.

Figs. 3-6 inclusive are diagrammatic views of the gear sectors and their associated racks in valve closed and plug seated position;

Figs. 7-10 inclusive are diagrammatic views of the gear sectors and their associated racks in valve plug rotating position; and Figs. 11-14 inclusive are diagrammatic views of the gear sectors and their associated racks in valve open and plug seated position.

The drawings illustrate a straight-way valve, but the improvements are equally applicable to three or four way, elbow and angle valves.

The present invention relates to tapered plug valves, in which, during the operation of the valve, the conical plug is first unwedged from its seat by moving the plug in a straight line axially. After the plug is unseated, it is turned the desired angle to either an open or closed position. At the completion of the rotary movement, the plug is then moved axially and wedged or reseated. The plug operating mechanism includes three gears or sectors having teeth which are operated by three racks so as to effect the three movements of the plug above referred to, i. e., first, the unwedging of the plug, second, the turning of the plug, and third, the reseating of the plug after it has been turned. The manner in which the valve operating mechanism is constructed and operated will now be described.

Referring to the drawings, the improved valve comprises a main body or casing 11 having a cavity 12 formed therein for a tapered plug 13, the cavity 12 being intersected by a longitudinal waterway or opening 14 which constitutes a passage through the valve. The plug 13 has a passage 16 formed therein of substantially the same diameter as the valve passage 14, so that when the plug 13 is in fully open position, a uniform bore will extend through the valve from end to end.

The valve plug 13 may be equipped with seat rings 17 which are adapted to engage seat rings 18 mounted in the body 11 so as to provide a tight joint between the plug and the valve body when the plug is in either its open or closed position.

The tapered plug 13 is supported for both axial and rotary movement in the valve body 11.

At its inner or smaller end, the plug 13 is formed with an extension which constitutes a trunnion 20 having an opening 21 formed therein for the reception of a stem or spindle 22 projecting inwardly from the smaller end of the valve body 11.

At its outer or larger end, the plug 13 is formed with a tubular extension 19 which extends through a web 24 of a housing 25 attached to the valve body 11, said web constituting a cover plate for the larger end of the valve body, and said housing 25 constituting a closure for the valve operating mechanism.

A packing gland 26, which surrounds the tubular extension 19, prevents leakage of fluid around the tubular extension 19.

A bushing 27 surrounds the tubular extension 19 and constitutes the main bearing for the valve plug.

Fastened to the tubular extension 19 of the valve plug is a shaft 23. In the present instance, the valve shaft 23 is shown as being formed with a plurality of sections of different diameters.

The main or larger section of the valve shaft is indicated by the reference numeral 23. Beyond the main section 23 the shaft is formed with sections 28, 29 and 30 of lesser diameters than the portion 23 for a purpose to be hereinafter more fully described.

Mounted on the portion 28 of the valve shaft is a sleeve 32 having a portion of its exterior formed with screw threads 33. The sleeve 32 is free to turn on the valve shaft.

Mounted on the threaded portion 33 of sleeve 32 is a sector 34, the purpose of which is to effect the seating and unseating of the plug 13 during the operation of the device, as will be hereinafter described.

Also mounted on sleeve 32 is a second sector 35, which is connected to the sleeve 32 by means of a sliding key 36 (see Figs. 5, 9 and 13), so that when the sector 35 is rotated or operated, the sleeve 32 will also be turned.

A third sector 38 is mounted on the valve shaft 23. The purpose of sector 38 is to turn the valve plug 13 from closed to open position and vice versa. In the drawings the hub of sector 38 is shown as being constructed of two parts. This is done so that the parts can be more easily and cheaply made. When the device is being assembled the inner part of the hub of the sector 38 is connected to the outer portion of the hub by a key 15 so that both parts are as one and the inner part of the hub of the sector 38 is connected to the valve shaft 23 by a key 39.

The purpose of sector 38 is to turn the valve plug 13 from closed to open position and vice versa, and key 39 is a sliding key, by which axial movement of the valve shaft 23 is permitted during the operation of the device without imparting a similar movement to sector 38.

Interposed between sectors 34 and 35 is a washer 37, and interposed between sectors 35 and 38 is a washer 40. A washer 59 is interposed between the inner end of the hub of sector 38 and the adjacent wall 31 of housing 25. Another washer 60 is interposed between the outer end of the hub of sector 34 and the adjacent end of a hollow boss 81 of a cover 82 for the outer end of the housing 25. These washers serve as means for retaining the sectors properly positioned on the valve shaft.

The portion 29 of the valve shaft is formed with screw threads for the reception of a nut 42.

A thrust washer 43 is interposed between the inner face of sleeve 32 and the shoulder 44 between sections 23 and 28 of the valve shaft, and a second thrust washer 45 is interposed between the outer face of sleeve 32 and the inner face of nut 42.

The nut 42 is screwed inwardly an amount sufficient to retain the sleeve 32 in position on the portion 28 of the valve shaft, but nut 42 is not screwed in far enough to bear tightly against said sleeve, since the sleeve 32 should be free to turn on the shaft and should also be free to float up and down the shaft a slight distance, say .005 to .015 of an inch.

When the sleeve 32 has been properly positioned on the valve shaft, nut 42 is locked in place by means of a set screw 46.

Figure 3:
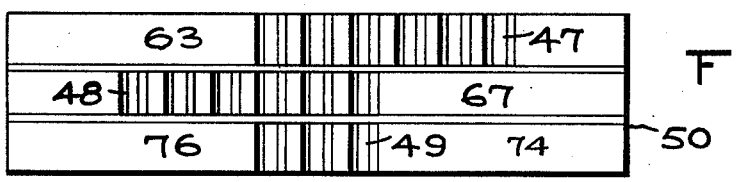

Operatively associated with the three sectors 34, 35 and 38, are three racks 47, 48 and 49, respectively. If so desired these racks may be formed separately. In the instant case the racks are shown formed integrally on a bar 50 slidably mounted within the housing 25, and the teeth of said racks are formed in staggered relation to each other, as shown in Figs. 3, 7 and 11, for a purpose to be hereinafter described.

Any suitable means may be employed for operating the racks. In the present instance the mechanism for operating the racks comprises manually operable gears and a screw operated by said gears for imparting rectilinear movements to the racks.

As shown in Fig. 1, the rack bar 50 is formed with laterally projecting lugs 86, through which extend rods 87, the rods being supported in the housing 25 in any suitable manner.

Figure 2:
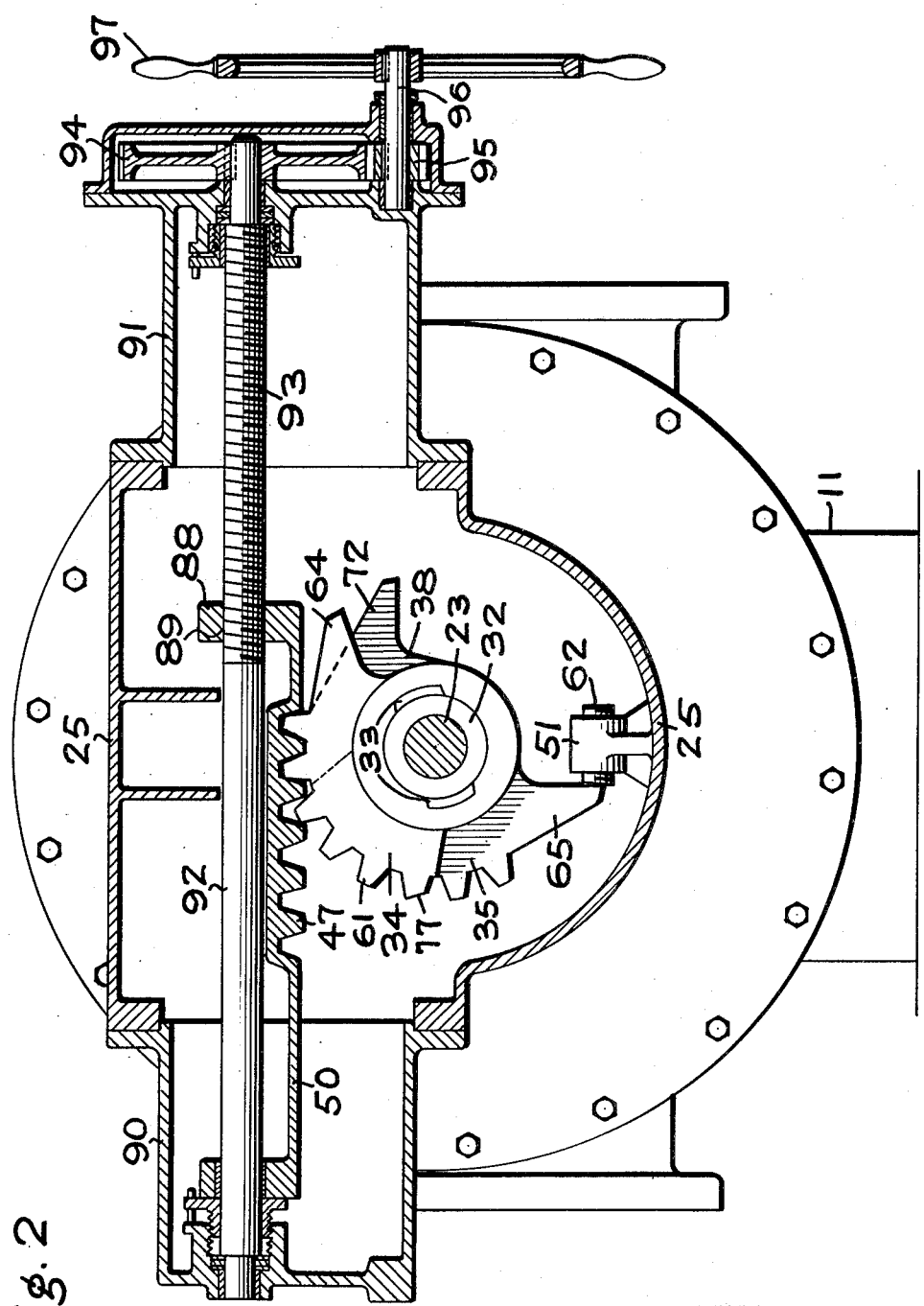
Fig. 2 is a transverse section taken along the line 2—2 of Fig. 1.

Projecting upwardly from one end of the rack bar 50 is a boss 88 having a threaded opening 89 formed therein as shown in Fig. 2.

The housing 25 is formed with lateral extensions 90 and 91. Rotatably mounted in these extensions of the housing 25 is a rod 92 which parallels the rods 87 heretofore referred to. The rod 92 is formed with a threaded portion 93 which extends through the threaded opening 89 of the boss 88 of the rack bar 50.

One end of the rod 92 carries a gear 94 which is in meshing relationship with a gear 95 on a shaft 96 rotatably mounted in the extension 91 of the housing 25. The outer extremity of the shaft 96 carries a hand wheel 97 which is adapted to be manually operated to impart rotation of the rod 92 through the gears 95 and 94.

Due to the threaded connection between the rod 92 and the rack bar 50, when the hand wheel is operated and thereby turns the rod 92, the rack bar 50 will be moved to and fro within the housing 25.

Each sector is formed with a series of teeth which are adapted to move in meshing relationship with the teeth of its associated rack during operation of the device, so that the sector will be rotated by its rack.

Means are also provided by which each sector will be locked in a predetermined position after such sector has been rotated, so that continued movement of the rack will not continue to operate the sector.

The disposition of the toothed and non-toothed portions of the sectors is such that when the racks 47, 48 and 49 are in one position, the teeth of certain sectors will be in meshing relationship with the teeth of their associated racks and other sectors will not have their teeth in mesh with teeth of their associated racks, and when the racks are moved from one position to another position, the teeth of other sectors will be moved into meshing relationship with the teeth of their associated racks so that the latter sectors will be actuated.

Figure 4:
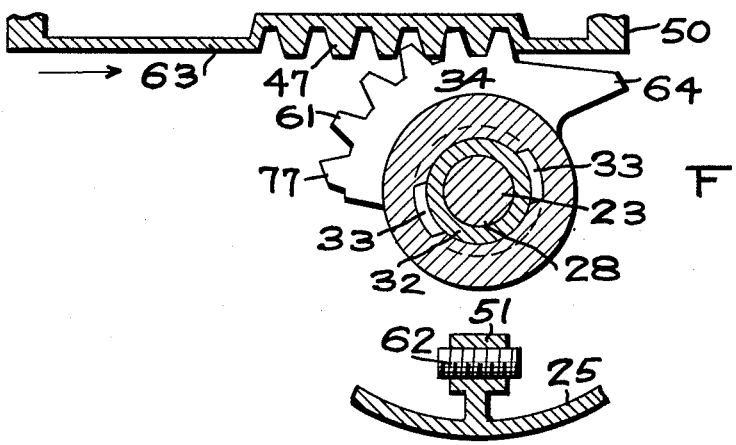

Referring to Figs. 2 and 4, sector 34 is formed with a series of teeth 61 for meshing with the teeth of the rack 47. At one end of the series of teeth 61, there is a cut-off or flattened tooth 77, which is adapted to engage a plain face 63 of rack 47 when the sector is in a certain position, as shown in Fig. 12.

Projecting outwardly from the sector 34 is a lug 64 adapted to engage a stop provided by a set screw 62 adjustably mounted in an extension 51 of housing 25 (see Fig. 12).

When the valve is closed and the plug 13 seated, the teeth 61 of sector 34 are in meshing relation with the teeth of rack 47. The disposition of sector 34 with respect to the rack 47 in this position of the device is such that only a few of the sectored teeth 61 are in mesh with the teeth of the rack, so that when the rack is moved in the direction of the arrow, Fig. 4, other teeth of the sector 34 will be made to mesh with the teeth of the rack 47, and consequently the sector 34 will be turned a predetermined amount by the rack.

After the sector 34 has thus been rotated a predetermined amount, through the intermeshing of the rack teeth 47 with the sector teeth 61, the teeth will unmesh and the flattened or deformed tooth 77 will be presented to the plain surface or untoothed portion 63 of the rack 47 and the lug 64 will abut the end of the set screw 62, as shown in Fig. 12, and thus further rotation of the sector 34 will be prevented.

Figure 5:
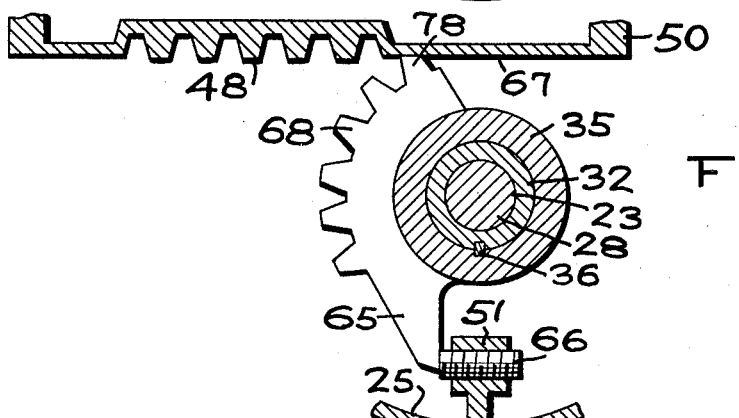

As shown in Figs. 5, 9 and 13, the sector 35 is formed with a series of teeth 68 adapted to mesh with the teeth of the rack 48. At one end of the series of teeth 68 there is a cut-off or flattened tooth 78 adapted to engage the plain surface 67 of the rack 48, as shown in Fig. 5.

Projecting from the sector 35 is a lug 65 adapted to engage a stop provided by a set screw 66 adjustably mounted in the extension 51 of housing 25 (see Fig. 5).

In so far as details of construction are concerned sector 35 is formed substantially similar at its periphery as is sector 34. However, as will be noted by comparing Fig. 5 with Fig. 6, sector 35 is mounted on the valve shaft 23 in a reverse manner to the disposition of sector 34, so that when the valve is closed and the plug 13 seated, flattened or deformed tooth 78 will abut the plain surface 67 of rack 48 and lug 65 will be in engagement with the end of set screw 66. In this position the teeth 68 of the sector 35 are not in mesh with the teeth of rack 48.

As shown in Fig. 3, the series of teeth of rack 48 are substantially equal in length and number to the series of teeth of rack 47, however the teeth of rack 48 are offset or staggered with respect to the teeth of rack 47, so that when the bar 50 is moved in the direction of the arrow, Fig. 4, the teeth of rack 48 will not mesh with the teeth 68 of sector 35 until after the bar 50 has moved a predetermined amount. Due to the engagement of the flattened or deformed tooth 78 with the plain surface 67 of rack 48, as well as the engagement of the lug 65 with set screw 66, sector 35 will remain stationary during the initial movement of the bar 50 in the direction of the arrow, Fig. 4.

Figure 6:
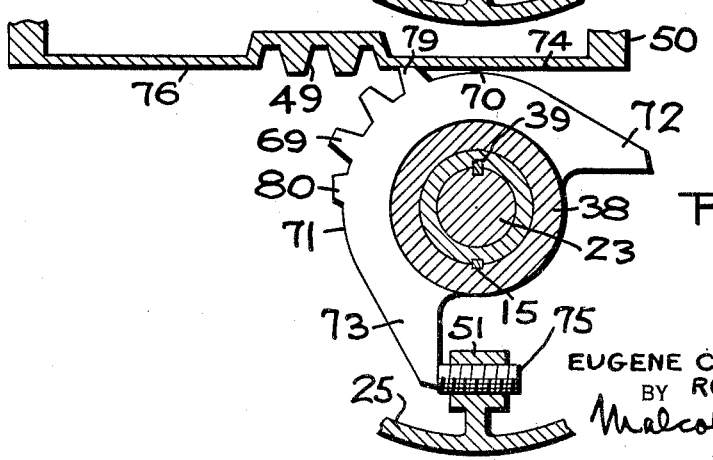

As shown in Figs. 6, 10 and 14, sector 38 is formed with a comparatively short series of teeth 69 which are disposed intermediate two plain arcuate portions 70 and 71. The end tooth adjacent plain surface 70 is cut-off or flattened, as indicated at 79, and the end tooth adjacent plain surface 71 is also cut-off or flattened, as indicated at 80.

A lug 72 is formed at the outer end of plain section 70, and a similar lug 73 is formed at the outer end of plain section 71. These lugs are adapted to engage a stop provided by a set screw 75 adjustably mounted in the extension 51 of housing 25, (see Figs. 1, 6 and 14).

As shown the three set screws 62, 66 and 75 are disposed in the portion 51 of the housing in a juxtaposed position relative to each other and the ends of such set screws are formed so as to receive a suitable tool such as a wrench or the like (Fig. 1), so that said set screws may be properly positioned to receive the lugs extending from the sectors, respectively, and thereby limit rotation of said sectors.

When the valve is closed and the plug 13 seated cut-off or flattened tooth 79 of sector 38 is in engagement with a plain surface 74 on the rack 49, and lug 73 is in engagement with the end of set screw 75, so that sector 38 is prevented from rotating during the initial movement of the rack bar 50.

When the valve is open and the plug 13 seated, cut-off or flattened tooth 80 of sector 38 is in engagement with plain surfaces 76 on the rack 49, and the lug 72 is in engagement with the end of set screw 75, thereby preventing rotation of the sector 38 (see Fig. 14).

Sector 38 is keyed to the valve shaft, as shown in Fig. 6, and consequently when the sector teeth 69 are in meshing relationship with the teeth of rack 49, the movement of the rack a predetermined amount rotates the sector 38 and the valve shaft fixed thereto through a predetermined angle, thereby turning the valve plug 13.

As shown in Fig. 3, the first tooth of rack 49 alines with the first tooth of rack 48, and since the first teeth 78 and 79 of sectors 35 and 38, respectively, are correspondingly positioned, consequently when the bar 50 has moved a distance in the direction of the arrow, Fig. 4, to engage sector teeth 68 with rack 48, the teeth 69 of sector 38 will also be engaged by the teeth of rack 49, so that both sectors 35 and 38 will rotate in unison. However, since there are fewer teeth formed on sector 38 and rack 49, than are formed on sector 35 and rack 48, the teeth of sector 38 will unmesh from the teeth of rack 49 prior to the unmeshing of the teeth of sector 35 with the teeth of rack 48. Therefore, sector 38 will not be turned through as great an angle as sector 35.

Since sector 35 is connected to the sleeve 32 by sliding key 36, rotation of sector 35 by its rack 48 effects corresponding movement of the sleeve. Therefore, it will be noted that the purpose of sector 35 and its rack 48 is to rotate sleeve 32. When cut-off tooth 78 is in engagement with plain surface 67 of rack 48 and lug 65 is in engagement with set screw 66, sector 35 is locked in position, and consequently sleeve 32 is held stationary. Accordingly, during the initial movement of rack bar 50, due to the threaded engagement of sector 34 with the threads 33 of sleeve 32, the rotation of sector 34 about stationary sleeve 32 effects movement of the sleeve 32 longitudinally of the axis of shaft 23. However, since the sleeve 32 is prevented from moving longitudinally with respect to the valve shaft 23 by nut 42 and washer 45 at one end and washer 43 at the opposite end of said sleeve, obviously any longitudinal movement imparted to sleeve 32 by the sector 34 will cause a corresponding longitudinal or axial movement of valve shaft 23, and since plug 13 is fixed to shaft 23, the plug will also be moved longitudinally or axially in the valve body 11.

The construction and mode of operation of the parts is such that initial movement of the rack bar 50 causes the valve shaft 23 and plug 13 to move in the direction of the arrow, Fig. 1, whereby the plug is unwedged. After the rack bar 50 has moved a predetermined amount and the plug 13 has thus been unwedged, the sectors 35 and 38 will be rotated by the racks 48 and 49, respectively, and this results in both the valve shaft 23 and sleeve 32 being also rotated together with the sector 34. Since sector 34 and sleeve 32 are now simultaneously being rotated, there will not be any relative movement of sleeve 32 with respect to the threaded hub of sector 34 and consequently the valve plug will remain in its unwedged position during the period it is being rotated by sector 38.

When the valve plug 13 has been rotated through a predetermined angle, the teeth of sectors 34 and 38 unmesh from the rack teeth 47 and 49, respectively, so that continued movement of rack bar 50 is ineffective in causing further rotation of the valve plug 13, through sector 38 and valve shaft 23, and sector 34.

However, since the teeth 68 of sector 35 remain in meshing relationship with the rack teeth 48, sector 35 will continue to rotate after the rotation heretofore imparted to sectors 34 and 38 is halted. This continued rotation of sector 35 causes a corresponding rotation of sleeve 32, and due to the fact that sector 34 is not stationary, due to the engagement of cut-off tooth 77 with plain surface 63 of rack 47 and the engagement of lug 64 with set screw 62, sleeve 32 is unscrewed from the threaded hub of sector 34 and the valve shaft 23 is now moved longitudinally or axially in the direction opposite to the arrow (Fig. 1) and consequently, the plug 13 is reseated or rewedged in the valve housing 11.

From the foregoing, it will thus be noted that, assuming that the valve plug 13 is in closed position, as shown in Fig. 1, when it is desired to open the valve the hand wheel 97 is turned in the direction which will effect movement of the rack bar 50 in the direction of the arrow, Fig. 4. This movement of the rack bar from left to right, effects rotation of the sectors 34, 35 and 38 in a clockwise direction, with the result that the valve plug 13 is first unseated or unwedged, then rotated, and then seated or rewedged, as has heretofore been described, thereby opening the passage through the valve.

When it is desired to close the valve, the hand wheel is turned in the opposite direction so that the rack bar 50 is moved towards the left, and this action effects rotation of the sectors 34, 35 and 38 in a counterclockwise direction from their respective positions shown in Figs. 12, 13 and 14 to the positions shown respectively in Figs. 4, 5 and 6, thereby operating the parts in an opposite direction from that described above so that the plug is closed and reseated, as shown in Fig. 1.

In the embodiment of the invention herein shown and described, the construction and operation of the valve is such that the plug is first moved in a straight line axially a predetermined distance through the operation of rack 47 and sector 34, then the plug is turned through an angle of 90° through the operation of rack 49 and sector 38. During the turning of the plug both of the sectors 34 and 35 rotate in unison with sector 38 and consequently the plug remains in its unwedged position. At the completion of the turning movement of the plug, sector 34 remains stationary with sector 38, and sector 35 continues to rotate an amount so that the plug is moved in a straight line axially towards its seat a distance equal substantially to the distance the plug was first moved away from its seat.

It will be understood that modifications can be made in the construction of the valve without departing from the scope of the invention.

Having thus described our invention, what we claim is:—

In mechanism for operating the shaft of a tapered plug valve, a plurality of gear sectors operatively associated with the shaft for imparting axial and rotary movements thereto and comprising three independently movable gear sectors, a housing enclosing the operating mechanism and having lateral extensions, each of said gear sectors having a series of teeth, a reciprocal rack bar disposed within said housing and having three series of teeth adapted to mesh respectively with the teeth of said three gear sectors, three rods enclosed by said housing and disposed in parallel relationship with said rack bar, the intermediate rod being rotatably mounted within said housing and having its ends journalled in the opposite ends of the lateral extensions of said housing whereby said rotatable rod is prevented from moving longitudinally with respect to the housing, the other two rods being disposed on opposite sides of said rotatable rod and having their ends fixed in said housing, said two rods constituting guide rods for the rack bar, ears extending laterally from said rack bar and mounted on the guide rods whereby said rack bar is suspended from the guide rods, threads formed on a portion of said rotatable rod, said rack bar having end extensions mounted on the rotatable rod, one of said end extensions being threaded and constituting a nut for engaging the threaded portion of said rotatable rod so that when said rod is rotated the rack bar will be propelled lengthwise of the rotatable rod, and mechanism operatively connected to one end of said rotatable rod for operating the same.

EUGENE C. BRISBANE.
ROBERT BISCHOFF.